United States Patent [19]

Miyazaki et al.

[11] Patent Number: 4,637,884

[45] Date of Patent: Jan. 20, 1987

[54] SLIDING MEMBER OF GRAPHITE-BORON CARBIDES

[75] Inventors: Kenji Miyazaki, Dazaifu; Tsuyoshi Hagio; Ichitaro Ogawa, both of Tosu; Hisayoshi Yoshida, Ogori; Kazuo Kobayashi; Kazutsugu Kashima, both of Tosu; Takashi Tada; Yoichiro Hayashi, both of Fujisawa; Wataru Abe, Hiratsuka, all of Japan

[73] Assignees: Agency of Industrial Science and Technology; Oiles Industry Co., LTD, both of Tokyo, Japan

[21] Appl. No.: 756,086

[22] Filed: Jul. 17, 1985

[30] Foreign Application Priority Data

Jul. 20, 1984 [JP] Japan .................................. 59-149706

[51] Int. Cl.$^4$ ............................................. F16C 33/16
[52] U.S. Cl. ......................................... 252/12; 252/29; 252/30
[58] Field of Search ..................... 252/29, 12, 30, 12.2; 501/90, 87

[56] References Cited

U.S. PATENT DOCUMENTS 4,518,702 5/1985 Yoshida et al. ..................... 501/90
4,524,138 6/1985 Schwetz et al. ..................... 501/90

FOREIGN PATENT DOCUMENTS 56-37192 8/1981 Japan .

Primary Examiner—Jacqueline V. Howard
Attorney, Agent, or Firm—Cushman, Darby & Cushman

[57] ABSTRACT

Disclosed herein is a high temperature-resistant and abrasion-resistant sliding member of graphite-boron carbides showing the friction coefficient of 0.01 to 0.13 and the specific abrasion amount of $10^{-7}$ to $10^{-9}$ mm$^2$/kg under the measuring conditions of the load of 20 kg/cm$^2$ and the sliding velocity of 5 m/min at a temperature of 300° C., the bending strength of 300 to 1600 kg.f/cm$^2$ and the Shore hardness of from 45 to 60, obtained by mixing and stirring from 65 to 95% by weight of powdery carbon of an average particle size of 10 to 150 μm and from 5 to 35% by weight of powdery boron carbide of an average particle size of 0.5 to 2.5 μm until the powdery boron carbide is uniformly dispersed in the powdery carbon, and sintering the thus formed mixture at a temperature of 2020° C. or more and less than the transition point at which the structure of carbon and boron carbide in the thus formed mixture is remarkably changed, under a pressure of 100–250 kg/cm$^2$.

4 Claims, 2 Drawing Figures

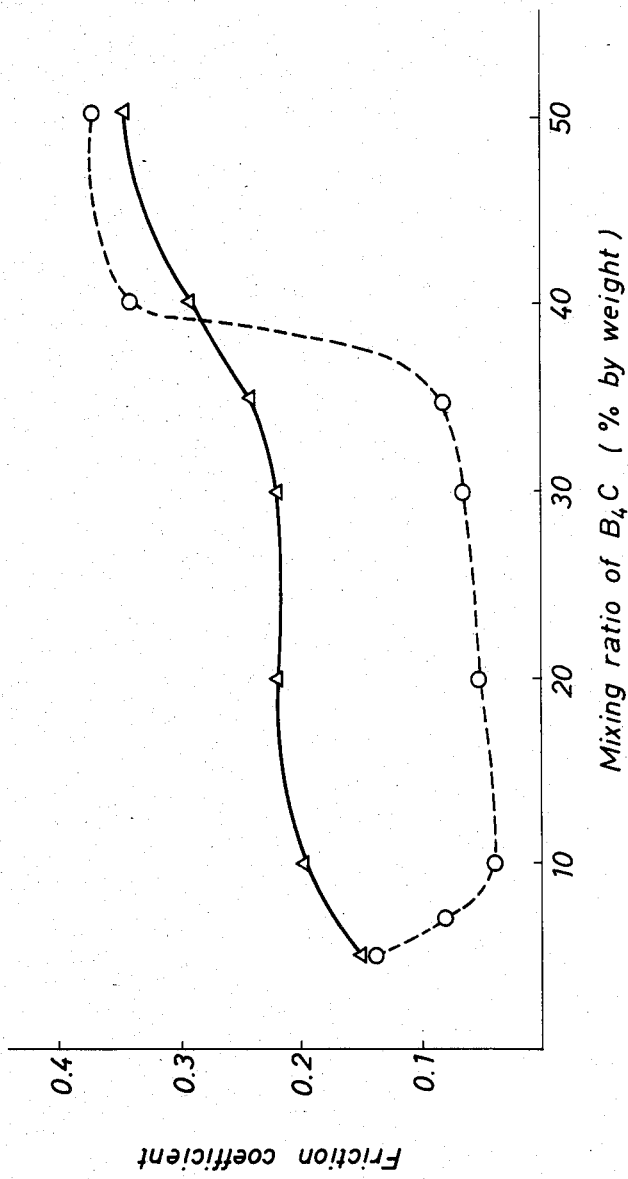

SLIDING MEMBER OF GRAPHITE-BORON CARBIDES

BACKGROUND OF THE INVENTION

The present invention relates to a sliding member of graphite-boron carbides, which is useful as the member in the part where friction is caused by sliding in bearings, cylinders, slide valves and the like, and more in detail, the present invention relates to a novel sliding member showing a favorable specific properties, particularly to friction and abrasion at a high temperature, which is suitably fitted for the use under such conditions that it is difficult to use a fluid lubricant such as lubricating oils and greases, namely the so-called dry friction conditions.

In recent years, with the development of mechatronics, the demands for the sliding members, which are excellent in frictional- and abrasional properties, particularly in the high temperature region have been raised.

For instance, to the sliding members used in a high temperature region of 200° to 500° C., any fluid lubricant such as lubricating oil and grease cannot be applied between the surfaces contacting to each other and accordingly, a solid lubricant such as graphite and molybdenum disulfide is used.

However, since the solid lubricants usually have no fluidity nor wettability as in the fluid lubricants, such a solid lubricant cannot be applied by a means such as painting, impregnating and pouring.

Accordingly, in the case of a solid lubricant, it must be applied by means of (i) covering the friction surface with the solid lubricant, (ii) preparing the sliding member itself of the solid lubricant or (iii) using the mixture of the lubricant and another material. In the case of adopting any of the above-mentioned means, since the lubricating effect is exhibited at the first time after a part of the solid lubricant thus applied on the sliding, friction surface is transferred to the surface of the mating material, the frictional- and abrasional property of the solid lubricant is influenced by the degree of film-forming property of the solid lubricant on the surface of the mating material.

Although graphite which has been broadly used as a solid lubricant is an excellent solid lubricant from the view point that it is excellent in lubricating property, non-melting property, thermal conductivity and heat-resistance and it is small in thermal expansion, it is insufficient to transfer to the surface of the mating material and its film-forming property on the surface of the mating material is insufficient. Accordingly, graphite is not necessarily sufficient in the frictional- and abrasional properties, and in addition, since graphite is low in mechanical strength, there is a difficult point that in the case where the sliding member itself is made from graphite, the periphery of the member must be reinforced by a metal or graphite must be reinforced by impregnating with a metal.

Besides, as the material for sliding members used under the dry conditions, graphite impregnated with a synthetic resin, mixtures of graphite and molybdenum disulfide or polytetrafluoroethylene, and graphite covered with molybdenum disulfide or polytetrafluoroethylene have been proposed, however, since such materials melt, thermally decompose or are oxidized at a high temperature, there is a demerit that they cannot be practically used under the temperature condition of higher than 300° C.

Formerly, the present inventors proposed a process for producing a high-density graphite-boron carbide composite material, the process comprising the steps of adding boron carbide as a sintering accelerator into powdery coke and sintering the thus obtained mixture at a temperature of higher than 2000° C. under a pressure of higher than 200 kg/cm$^2$ (refer to Japanese Patent Publication No. 56-37192 (1981)).

Japanese Patent, Publication No.,56-37192 (1981) discloses a process for producing the graphite-boron carbide composite material having a high density, for instance, bulk density of 2.07, 2.15 and 2.23, respectively, a high strength and a high hardness, comprising, concretely, the steps of adding 10, 20 and 40% by weight of powdery boron carbide, respectively to powdery pitch coke, sufficiently blending the two components, getting each 25 g of the thus prepared mixture in each of graphite molds of 30 mm in diameter, sintering each mold containing the mixture at 2200° C. under a pressure of 200 kg/cm$^2$ and after maintaining thereof at the temperature for 1 hour, cooling thereof to room temperature.

As a result of the present inventors' further studies for a process for producing a graphite-boron carbide composite material of a high density, they have found that in the case where sliding members are prepared by using a composite graphite-boron carbide material produced by the steps of mixing by stirring from 65 to 95% by weight of powdery carbon of 10 to 150 μm in an average particle size and from 5 to 35% by weight of powdery boron carbide of 0.5 to 2.5 μm in an average particle size until the powdery boron carbide is uniformly dispersed in the powdery carbon and sintering the thus prepared mixture at a temperature of 2020° C. or more and less than a transition point at which the structure of carbon and boron carbide in the thus prepared mixture is remarkably changed, under a pressure of 100 to 250 kg/cm$^2$, thereby sintering thereof, the above-mentioned demerits of the sliding members can be solved, and based on the finding, the present invention has been attained.

Namely, the object of the present invention is to provide with the sliding members which overcome the demerits of the conventional solid lubricants, show favorable transferring property to and film-forming property on the surface of the mating material and at the same time, show an excellent frictional- and abrasional characteristic properties and a high mechanical strength in a high temperature region.

SUMMARY OF THE INVENTION

In an aspect of the present invention, there is provided a high temperature-resistant and abrasion-resistant sliding member of graphite-boron carbides which shows a friction coefficient of 0.01 to 0.13 and a specific abrasion amount of $10^{-7}$ to $10^{-9}$ mm$^2$/kg under the measuring conditions of a load of 20 kg/cm$^2$, a sliding velocity of 5 m/min and an atmosphere temperature of 300° C., a bending strength of 300 to 1600 kg.f/cm$^2$ and a Shore hardness of 45 to 60, and is produced by mixing and stirring from 65 to 95% by weight of powdery carbon of an average particle size of 10 to 150 μm and from 5 to 35% by weight of powdery boron carbide of an average particle size of 0.5 to 2.5 μm until the powdery boron carbide is uniformly dispersed in the powdery carbon and sintering the thus prepared mixture at a temperature of 2020° C. or more and less than the transition point at which the structure of carbon and boron carbide in the mixture is remarkably changed.

BRIEF EXPLANATION OF DRAWINGS

Of the attached drawings,

FIG. 2 is a graph showing the relationship between the mixing ratio of powdery boron carbide to powdery carbon and the friction coefficients of the sliding members at room temperature and a high temperature.

DETAILED EXPLANATION OF THE INVENTION

Figure 1:
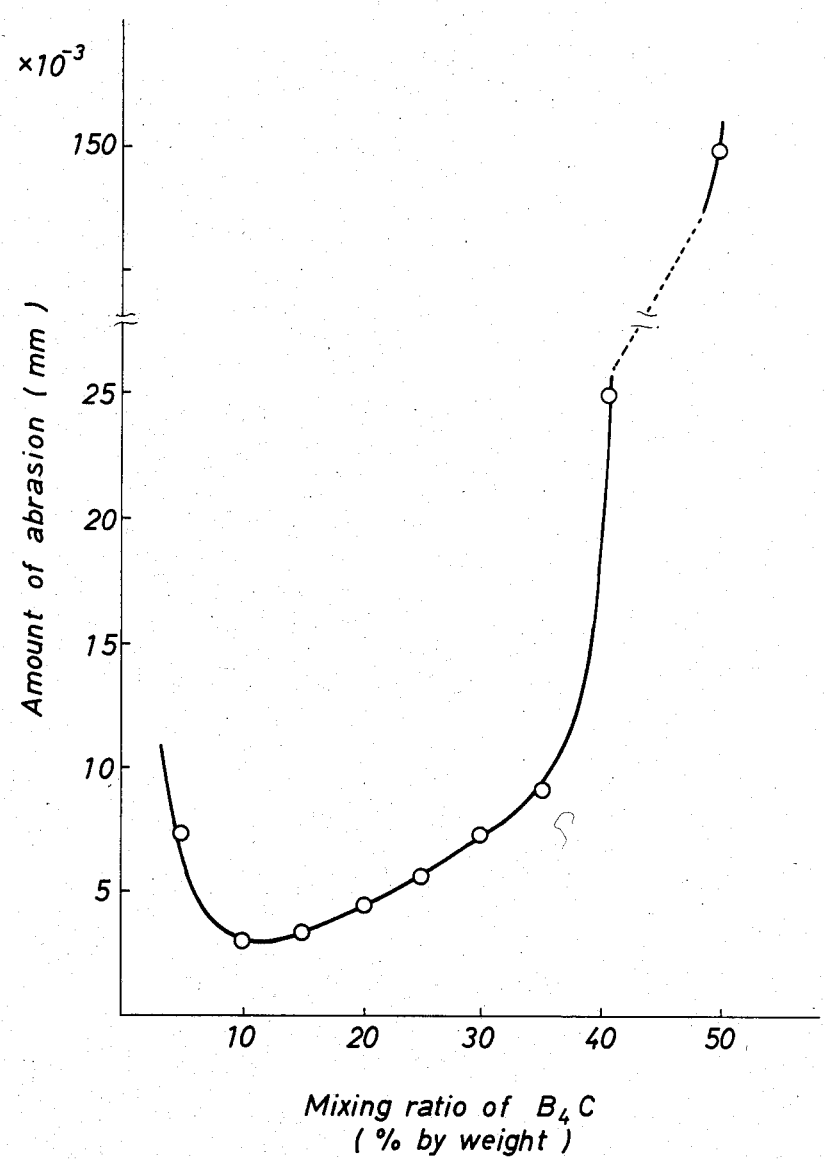
FIG. 1 is a graph showing the relationship between the mixing ratio of powdery boron carbide to powdery carbon and the abrasion amount of the sliding member at a high temperature.

The sliding member according to the present invention comprises a high temperature-resistant and abrasion-resistant composite material of graphite-boron carbides, which shows a friction coefficient of 0.01 to 0.13 and a specific abrasion amount of $10^{-7}$ to $10^{-9}$ mm$^2$/kg under the measuring conditions of a load of 20 kg/cm$^2$ and a sliding velocity of 5 m/min at a temperature of 300° C., a bending strength of 300 to 1600 kg.f/cm$^2$ and a Shore hardness of 45 to 60 and is obtained by the process comprising the steps of mixing from 65 to 95% by weight of powdery carbon of an average particle size of 10 to 150 μm and from 5 to 35% by weight of powdery boron carbide of an average particle size of 0.5 to 2.5 μm, stirring the thus prepared mixture until the powdery boron carbide is uniformly dispersed in the powdery carbon, and sintering the thus formed mixture at a temperature of 2020° C. or more and less than the transition point at which the structure of carbon and boron carbide in the thus formed mixture is remarkably changed.

As the powdery carbon for use in the present invention, for instance, amorphous carbon such as coke, anthracite, carbon black, charcoal, etc. or powdery graphitic carbon such as artificial graphite, kish graphite, natural graphite, etc. may be mentioned, and they may be used singly or in the form of a mixture of more than two of them. In addition, the average particle size of the powdery carbon for use in the present invention is from 10 to 150 μm, preferably from 80 to 120 μm.

In the case of using the powdery carbon of an average particle size of over 150 μm, a uniform mixture thereof with the powdery boron carbide(hereinafter referred to as B$_4$C) is not available, and the diffusion and permeation of boron of B$_4$C into carbon in the sintering step is hardly effected resulting in the reduction of the frictional- and abrasional characteristic properties of the sliding member made of the composite material, at a high temperature.

On the other hand, the powdery carbon of an average particle size of below 10 μm is not favorable from the view points of processability, preservability and economy thereof.

The average particle size of the powdery B$_4$C for use in the present invention is from 0.5 to 2.5 μm, preferably from 0.7 to 1.5 μm. The powdery B$_4$C of an average particle size of over 2.5 μm is not uniformly dispersed in the powdery carbon resulting in a demerit of increasing the abrasion of the mating material in the case where such B$_4$C is used as one component of the sliding member. On the other hand, the powdery B$_4$C of an average particle size of below 0.5 μm and easily reacts with particularly oxygen resulting in the oxidation of the surface of B$_4$C which causes the problems of preservability, processability and availability thereof as well as the economic problem.

More in detail, the sliding member according to the present invention is obtained by mixing from 65 to 95% by weight, preferably from 80 to 90% by weight of the above-mentioned powdery carbon and from 5 to 35% by weight, preferably from 10 to 20% by weight of the above-mentioned powdery B$_4$C and after stirring the thus prepared mixture until the powdery B$_4$C is uniformly dispersed into the powdery carbon, sintering the thus stirred mixture at a temperature of 2020° C. or more and less than the transition point at which the structure of carbon and B$_4$C in the thus obtained uniform mixture is remarkably changed, preferably from 2050° C. to 2150° C. under a pressure of 100 to 250 kg/cm$^2$, preferably from 180 to 230 kg/cm$^2$.

In the case of carrying out the sintering under a pressure of below 100 kg/cm$^2$, the thus obtained sliding member cannot exhibit the strength as the sliding member, and on the other hand, there are economic and operational problems in applying the pressure over 250 kg/cm$^2$, which are based on the necessity of using a special mold for applying such a high pressure.

Further, in the case where the temperature of sintering of the mixture is below 2020° C., the strength of the thus obtained sliding member is insufficient as the sliding member, and on the other hand, in the case where the temperature is over the transition point at which the structure of carbon and B$_4$C in the mixture is remarkably changed, the anti-abrasional property of the thus obtained sliding member is very low although the strength thereof is sufficiently high.

In addition, in the case where raw coke is used as the raw material for carbon, the sliding member of the present invention can be produced by adding a predetermined, necessary amount of powdery B$_4$C to raw coke and sintering the thus prepared mixture under normal pressure.

In the process according to the present invention, B$_4$C acts as the sintering accelerator of powdery carbon and, at the same time, it is useful in improving the frictional- and abrasional properties of the sliding member in the high temperature region while being contained in the thus sintered material.

Although the effect of B$_4$C as the sintering accelerator appears in the case where the amount of B$_4$C in the mixture is about 3% by weight of the mixture, all boron atoms in such a small amount of B$_4$C are dissolved in carbon to form a solid solution resulting in the absence of B$_4$C in the sintered material and accordingly, the improvement of the mechanical strength and the frictional- and abrasional characteristic properties of the sintered material is not sufficiently expectable. Accordingly, in order to provide the thus sintered material with the favorable property as the sliding member, it is necessary to add not less than 5% by weight of B$_4$C to the powdery carbon.

On the other hand, in the case of adding B$_4$C in an amount of over 35% by weight, the friction coefficient of the thus obtained sliding member is largely raised, the anti-abrasion property thereof is largely reduced and further, the member becomes to injure the surface of the mating material. The reason of deterioration of the frictional- and abrasional properties of the thus obtained sliding member in the case of using an amount of B$_4$C of over 35% by weight is considered to be the presence of the abrased powder of $B_4C$ once formed by cracking on the sliding surface resulting in changing the state gradually to abrasive abrasion.

As the furnace used in the present invention for sintering the mixture of $B_4C$ and carbonaceous raw material, the so-called atmospheric furnace and the so-called ambience furnace may be exemplified. The so-called atmospheric furnace is a furnace having a quartz tube as the protecting tube which is in contact to atmospheric air and is packed with powdery graphite for preventing oxidation, and the so-called ambience furnace having a quartz tube as the protecting tube which is placed in a chamber and is filled with an inert gas such as gaseous nitrogen and argon, etc.

The sliding member of graphite-boron carbides according to the present invention is excellent not only in strength but also in frictional- and abrasional properties, particularly in the high temperature region. Namely, both the friction coefficient and the abrasion amount comprising the composite material of graphite-boron carbides according to the present invention. The physical specificities and the frictional- and abrasional properties of the thus obtained sliding members are shown in Table 1 as the specimens Nos. 2 to 6.

COMPARATIVE EXAMPLE 1

As Comparative Example, the specimens Nos. 1, 7, 8 and 9 were produced as follows.

The specimens Nos. 1 and 7 were produced in the same procedures as in Example 1 except for mixing 3% by weight and 40% by weight of powdery $B_4C$ to powdery calcined pitch coke.

The specimen No. 8 was produced by using the conventional binder of pitches, and is the sliding member comprising graphite, and the specimen No. 9 is the sliding member comprising graphite, which was produced by impregnating aluminum into the graphite material obtained by using a binder of pitches.

TABLE 1

| Specimen No. | Mixing ratio of $B_4C$ (% by weight) | Shore hardness | Bulk density (g/cm$^3$) | Bending strength (kg · f/cm$^2$) | Friction coefficient at 25° C. | Friction coefficient at 300° C. | Amount of abrasion at 300° C. (mm) | Specific amount of abrasion at 300° C. (mm$^2$/kg) |
|---|---|---|---|---|---|---|---|---|
| 1 (Comp. Ex.) | 3 | 40 | 1.90 | 250 | 0.21 | 0.15 | 0.010 | $5.0 \times 10^{-8}$ |
| 2 | 5 | 46 | 2.01 | 300 | 0.15 | 0.13 | 0.007 | $3.5 \times 10^{-8}$ |
| 3 | 10 | 50 | 2.10 | 380 | 0.20 | 0.04 | 0.003 | $1.5 \times 10^{-8}$ |
| 4 | 20 | 53 | 2.15 | 750 | 0.20 | 0.05 | 0.005 | $2.5 \times 10^{-8}$ |
| 5 | 30 | 57 | 2.24 | 1500 | 0.20 | 0.08 | 0.008 | $4.0 \times 10^{-8}$ |
| 6 | 35 | 60 | 2.26 | 1580 | 0.23 | 0.085 | 0.009 | $4.5 \times 10^{-8}$ |
| 7 (Comp. Ex.) | 40 | 63 | 2.28 | 1650 | 0.30 | 0.37 | 0.025 | $12.5 \times 10^{-8}$ |
| 8 (Comp. Ex.) | — | 35 | 1.64 | 265 | 0.23 | 0.17 | 0.012 | $6.0 \times 10^{-8}$ |
| 9 (Comp. Ex.) | — | 73 | 2.10 | 1100 | 0.22 | 0.35 | 0.050 | $25.0 \times 10^{-8}$ | thereof are small in the high temperature region. The highest effect of the present invention results by the addition of 10% by weight of $B_4C$ in the friction coefficient of 0.04 and the specific amount of abrasion of $3.5 \times 10^{-8}$ mm$^2$/kg.

The present invention will be explained more in detail while referring to the non-limitative Examples and Comparative Examples as follows.

In addition, the determination of the friction coefficient and the abrasion amount of the specimens in Examples and Comparative Examples were carried out by using the SUZUKI type thrust tester while sliding a block-shaped test piece of the specimen of 20 mm in length, 20 mm in width and 7 mm in thickness against a stainless steel tube of 20 mm in length, 18 mm in outer diameter and 14 mm in inner diameter at a velocity of 5 m/min under a load of 20 kg/cm$^2$. The amount of abrasion is the value after carrying out the test for 2 hours.

EXAMPLE 1

After mixing powdery boron carbide of a mean particle-diameter of 1.5 μm with powdery calcined pitch coke of an average particle size of 100 μm at the mixing ratio shown in Table 1, the mixed material was stirred to obtain a uniform mixture of the powdery coke and the powdery boron carbide, and after filling a graphite mold with the thus obtained mixture, the mold was heated to 2100° C. while applying a pressure of 200 kg/cm$^2$ and was kept at the temperature under the pressure for one hour to sinter the mixture. After cooling the mold to room temperature, the content of the mold was put out therefrom to obtain the sliding member As has been shown in BRIEF EXPLANATION OF DRAWINGS, FIG. 1 is a graph indicating the relationship between the mixed amount of $B_4C$ and the abrasion amount of each product of Example 1 and Comparative Example 1, and FIG. 2 is a graph indicating the relationship between the mixed amount of $B_4C$ and the friction coefficient of each product of Example 1 and Comparative Example 1 at 25° C. by a solid line, and that at 300° C. by a dotted line.

The fact that such a behavior of the friction coefficient as seen in FIGS. 1 and 2 shows the same tendency in the cases of using other amorphous powdery carbons or powdery graphites than the calcined powdery coke has been confirmed by the present inventors experimentally.

As seen in Example 1 and Comparative Example 1, the sliding members of graphite-boron carbides obtained by mixing and stirring from 5 to 35% by weight of powdery boron carbide with from 95 to 65% by weight of powdery amorphous carbon (powdery coke) and sintering the thus prepared uniform mixture, show the equal frictional- and abrasional properties to those of the conventional graphitic sliding members (refer to the specimen No. 8) at room temperature, and particularly in the high temperature region, a remarkable difference of the frictional- and abrasional properties appeared between the two sliding members.

In addition, although Example 1 exemplifies using a powdery amorphous carbon as the powdery carbon according to the present invention, the same effects are available also in the cases of using other powdery amorphous carbon, artificial powdery graphite, natural powdery graphite or a mixture thereof.

EXAMPLE 2

In a similar manner to Example 1, particularly except for using 90% by weight of the calcined pitch coke of an average particle size to 100 μm and 10% by weight of B$_4$C of an average particle size of 1.5 μm, the sliding members comprising composite material according to the present invention were produced as the specimens Nos. 2, 3, 4 and 5 at the sintering temperature shown in Table 2, respectively. The frictional- and abrasional characteristic properties thereof determined under the same conditions as in Example 1 are shown in Table 2 together with the results of the following Comparative Example 2.

TABLE 2

| Specimen | Temperature of sintering (°C.) | Friction coefficient at 25° C. | Friction coefficient at 300° C. | Specific amount of abrasion (mm$^2$/kg) at 300° C. |
| --- | --- | --- | --- | --- |
| No. 1*$^1$ | 2200 | 0.27 | 0.05 | 27.5 × 10$^{-8}$ |
| No. 2 | 2150 | 0.20 | 0.05 | 3.2 × 10$^{-8}$ |
| No. 3 | 2100 | 0.20 | 0.04 | 1.5 × 10$^{-8}$ |
| No. 4 | 2050 | 0.20 | 0.04 | 2.2 × 10$^{-8}$ |
| No. 5 | 2020 | 0.20 | 0.04 | 2.3 × 10$^{-8}$ |
| No. 6*$^2$ | 1950 | 0.24 | 0.06 | 14.5 × 10$^{-8}$ |

Notes:
*$^1$ and *$^2$ are Comparative Example 2.

COMPARATIVE EXAMPLE 2

As are clearly seen in Table 2, the specimens Nos. 1 and 6 were produced respectively by sintering the mixture at 2200° C. and 1950° C., and the abrasional property of the products at a temperature of 300° C. is remarkably inferior to that of the composite material (sintered at a temperature in the range of from 2020° to 2150° C.) according to the present invention.

What is claimed is:

1. A high temperature-resistant and abrasion-resistant sliding member of graphite-boron carbides, showing the friction coefficient of 0.01 to 0.13 and the specific abrasion amount of 10$^{-7}$ to 10$^{-9}$ mm$^2$/kg under the measuring conditions of the load of 20 kg/cm$^2$ and the sliding velocity of 5 m/min at a temperature of 300° C., the bending strength of 300 to 1600 kg.f/cm$^2$ and Shore hardness of 45 to 60, produced by the process comprising the steps of mixing and stirring from 65 to 95% by weight of powdery carbon of an average particle size of 10 to 150 μm and from 5 to 35% by weight of powdery boron carbide of an average particle size of 0.5 to 2.5 μm until said powdery boron carbide is uniformly dispersed in said powdery carbon, and sintering the thus prepared uniform mixture at a temperature of 2020° C. or more and less than the transition point at which the structure of carbon and boron carbide in said uniform mixture is remarkably changed, under a pressure of from 100 to 250 kg/cm$^2$.

2. A sliding member according to claim 1, wherein said uniform mixture is sintered at a temperature of 2050° to 2150° C. under a pressure of from 180 to 230 kg/cm$^2$.

3. A sliding member according to claim 1, wherein 80 to 90% by weight of said powdery carbon and 10 to 20% by weight of said powdery boron carbide are mixed and stirred.

4. A sliding member according to claim 1, wherein an average particle size of said powdery carbon is from 80 to 120 μm and an average particle size of said powdery boron carbide is 0.7 to 1.5 μm.

* * * * *